United States Patent
Viger et al.

(10) Patent No.: US 8,972,185 B1
(45) Date of Patent: Mar. 3, 2015

(54) CONSTRUCTING A TRANSIT TRANSFER NETWORK FROM TRANSIT DATA

(71) Applicant: Google Inc., Mountain View, CA (US)

(72) Inventors: Fabien Viger, Paris (FR); Lucien Pech, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/632,472

(22) Filed: Oct. 1, 2012

(51) Int. Cl.
*G01C 21/34* (2006.01)

(52) U.S. Cl.
USPC .......................................... 701/533

(58) Field of Classification Search
None
See application file for complete search history.

(56) References Cited

U.S. PATENT DOCUMENTS

| | | | |
|---|---|---|---|
| 2006/0047421 A1* | 3/2006 | Goldberg et al. | 701/209 |
| 2008/0140466 A1* | 6/2008 | dE Marcken | 705/6 |
| 2010/0153005 A1* | 6/2010 | Cerecke et al. | 701/201 |
| 2010/0235082 A1* | 9/2010 | Taniyama et al. | 701/201 |
| 2010/0286908 A1* | 11/2010 | Tate et al. | 701/209 |
| 2010/0305850 A1* | 12/2010 | Krumm et al. | 701/208 |
| 2011/0112759 A1* | 5/2011 | Bast et al. | 701/202 |
| 2011/0246061 A1* | 10/2011 | Hayashi | 701/201 |

FOREIGN PATENT DOCUMENTS

WO WO2011/131376 * 10/2011

OTHER PUBLICATIONS

Bast et al. "Fast Routing in Very Large Public Transportation Networks Using Transfer Patterns", Extended Online-Version of ESA'10 paper. Online Version was last modified on Jul. 6, 2010—16 pages.
De Berg et al., Algorithms—ESA 2010—18th Annual European Symposium, Liverpool, United Kingdom, Sep. 6-8, 2010 Proceedings, Part 1—21 pages.

* cited by examiner

*Primary Examiner* — John R Olszewski
*Assistant Examiner* — James M McPherson
(74) *Attorney, Agent, or Firm* — Dority & Manning, P.A.

(57) ABSTRACT

A computer-implemented method of constructing a transit transfer network from transit data comprises processing transit data to define a plurality of transfer endpoints; determining a set of acceptable transfer durations for each of a plurality of transfers associated with the transfer endpoints; determining one or more groups of endpoints to be merged, each group comprising two or more endpoints, wherein transfers associated with the endpoints in each said group have one or more common acceptable transfer durations; and merging the endpoints in each group to form one or more merged endpoints.

20 Claims, 6 Drawing Sheets

CONSTRUCTING A TRANSIT TRANSFER NETWORK FROM TRANSIT DATA

FIELD

The present invention relates to constructing a transit transfer network from transit data.

BACKGROUND

Public transport journey planning systems have been developed which provide step by step directions from a start location to a target destination via one or more forms of public transportation (hereinafter referred to as "transit") taking into account a selected start time or arrival time for the journey. The directions generated by the system may include a sequence of scheduled public transit departures which the user needs to make, and may also specify one or more transfers (e.g: by walking) from the location that one vehicle arrives to the location that another vehicle departs.

Transit data regarding transit schedules of transit vehicles (e.g: trains, trams, buses, ferries etc) may be provided to journey planning systems by one or more transit providers. Transfers and transfer times may be specified in the received data, or may be determined separately by a walking route planner which calculates a walking time between selected locations.

Journey planning systems which provide transit directions may generate a "transit graph" to represent transit data. For a description of transit graph generation, see US patent application publication no.: US2011/0112759, filed 1 Apr. 2010 with title "Transit Routing System for Public Transportation Trip Planning", which is hereby incorporated herein by reference.

A transit graph may include onboard and station nodes, each onboard/station node belonging to a single station of the transit graph. A station node represents a departing vehicle at a station that a user can board (i.e. enter). An onboard node represents a public transit vehicle that a user is currently boarded, at a given station.

Nodes in the transit graph may be connected to one another via directed arcs, for example:

- boarding arcs: These connect a station node to an onboard node;
- waiting arcs: These connect a station node to the next (in terms of time) station node at the same station;
- transit arcs: These connect an onboard node to an onboard node, and represent travelling between two consecutive stops in a trip;
- transfer arcs: These connect an onboard node to a station node. The station node may be in the same station, or could for example be in a nearby station. Transfer arcs represent a user getting off a vehicle represented by the onboard node, and transferring (e.g: walking) to the departing vehicle represented by the station node.

A transit graph can be interrogated to determine optimal public transit routes in response to a user query, or in some systems, during a pre-processing stage before a query is received. Reference is directed to US 2011/0112759 for a description of an approach which uses pre-processed transit information prior to query time in order to determine optimal public transit routes for journeys.

SUMMARY

A system and method is provided to construct a transit transfer network from transit data. The transit transfer network is used to determine the transfer (e.g: walking) arcs between nodes in a transit graph.

The transit transfer network is generated to store information relating to transfers between transit events in an efficient way. The transit transfer network comprises nodes referred to herein as "transfer endpoints" (or in short: endpoints), each transfer endpoint comprising one or more transit vehicle departure and/or arrival events. Pairs of endpoints in the transit transfer network may be connected to one another, and in some embodiments, one or more endpoints in the network may be connected to itself. Each connection within the transit transfer network is referred to herein as a transfer, whether it is a connection between endpoints or a connection which connects an endpoint to itself.

In an embodiment, vehicle departure and arrival events are assigned to endpoints in an efficient way to keep the number of transfer endpoints in the transit transfer network to a minimum. Reducing the number of transfer endpoints in this way is desirable to improve performance of applications incorporating the systems and/or methods described herein, which may directly depend on the size of the transit transfer network.

In an embodiment, constructing the transit transfer network comprises defining a plurality of initial endpoints based on the transit data, and then selectively merging compatible endpoints to form one or more merged endpoints.

Groups of compatible endpoints may be determined by first determining endpoints which are incompatible. In an embodiment, an incompatibility graph is formed of incompatible endpoints and a graph coloring is performed on the incompatibility graph to determine groups of compatible endpoints.

Compatibility or incompatibility between endpoints may comprise comparing sets of acceptable transfer durations determined for transfers from or to the endpoints. The sets of acceptable transfer durations are determined so that the feasibility or non-feasibility of transfers is respected.

Merging endpoints to form a merged endpoint may comprise merging the events included in the endpoints which are to be merged, and may also comprise merging transfers. A set of acceptable transfer durations for a merged transfer may be formed to include the intersection of the sets of acceptable transfer durations for the transfers to be merged.

In forming the final transit transfer network, a single transfer duration for transfers connecting endpoints may be selected from the set of acceptable transfer durations for the transfer, for example by selecting the highest acceptable transfer duration for each transfer.

BRIEF DESCRIPTION OF THE DRAWINGS

In order that the invention may be more fully understood, embodiments thereof will now be described by way of illustrative example with reference to the accompanying drawings, in which.

DETAILED DESCRIPTION

System Overview

Figure 1:
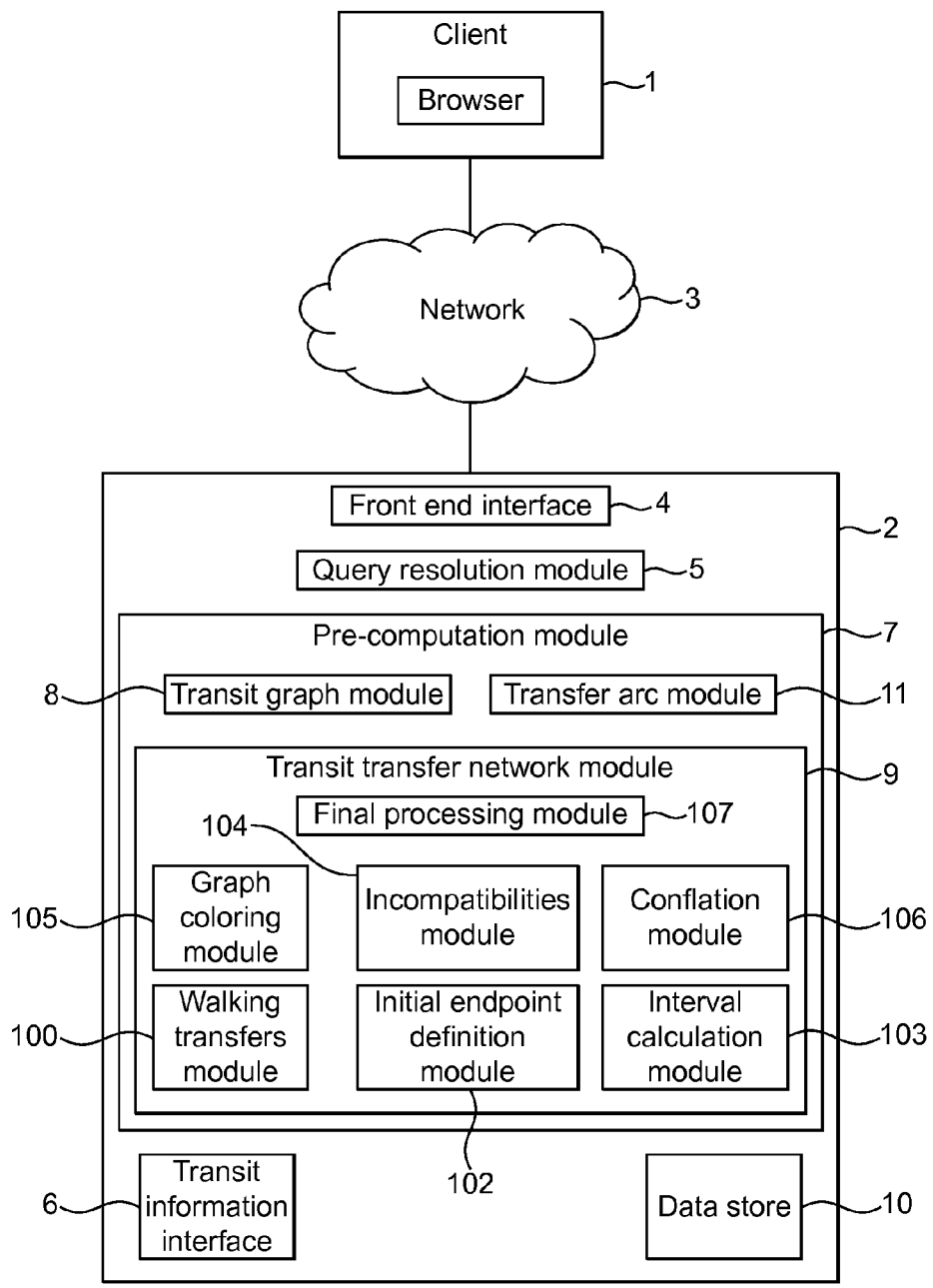
FIG. 1 is a schematic block diagram of a route planning system.

According to various embodiments of the present invention, a system and methodology is provided to construct (ie: generate) a transit transfer network from transit data. The transit transfer network comprises a directed graph of nodes generated by way of a conflation algorithm so as to represent and store information relating to walking transfers between vehicle arrival and departure events in an efficient way. The transit transfer network comprises transfer endpoints and transfers, each transfer connecting a transfer endpoint to another directionally, or in some embodiments, connecting an endpoint to itself.

According to various embodiments of the invention, events are grouped into endpoints such that events in a particular endpoint have shared properties with respect to transfers. Acceptable transfer durations are assigned for transfers between endpoints such that between any pair of first and second endpoints connected by a transfer, one or more transfer times are defined that apply to all of the transfers from the events of the first endpoint to the events of the second endpoint.

The transit transfer network is used in conjunction with a transit graph in the generation of transit directions. More specifically, the transit transfer network is used to determine transfer arcs between nodes of the transit graph. The transit graph is queried to determine optimal public transit routes, for example in response to a query or during a pre-processing stage.

To form the transit transfer network, the system processes received transit information to define a plurality of initial transfer endpoints, which are selectively merged to form the transfer endpoints of the eventual transit transfer network.

In an embodiment, each initial transfer endpoint comprises either only arrival event(s), or only departure event(s). Each arrival and departure event is associated with a time and day, a location where a vehicle stops, and a given transit vehicle. Since transfers occur when a user transfers (e.g: walks) from a location at which a vehicle arrives to a location at which a vehicle departs, arrival events can be considered to be the "source" of transfers and departure events can be considered to be the "target" of transfers. Thus, transfer endpoints comprising only arrival event(s) are referred to herein as "source endpoints" and transfer endpoints comprising only departure event(s) are referred to herein as "target endpoints. It will be appreciated that the source and target endpoints thus respectively form two disjoint sets.

An interval of acceptable transfer durations is determined for respective transfers between source and target endpoints. The acceptable transfer durations are determined so that the feasibility or non-feasibility of transfers is respected.

The system then determines one or more groups of target endpoints to be merged. This may be achieved by identifying incompatible endpoints, and then merging endpoints which are not incompatible.

Two target endpoints T1 and T2 may be considered incompatible if there exists a source endpoint S such that the intervals of acceptable transfer durations from S to T1 and from S to T2 do not intersect, ie: if there is no acceptable transfer duration that would suit both the transfer S to T1 and S to T2. The system iterates over all pairs of target endpoints, checks whether they are incompatible and thus builds an incompatibility graph, in which vertices are target endpoints and edges are incompatibilities.

The system then performs a graph coloring of the graph of incompatibilities. Graph coloring is well known per se to those skilled in the art and will not be described in detail herein. Briefly, a graph coloring involves assigning a "color" to each node of a graph such that no two adjacent nodes share the same color. Those skilled in the art will be aware of various algorithms for carrying out a graph coloring.

The graph coloring of the graph of incompatibilities gives an assignment from target endpoints to groups of compatible target endpoints (a color representing a group). In an embodiment, for each group of targets, the algorithm then merges them.

Merging a group of two or more target endpoints to form a merged target endpoint may comprise merging the departure events included in the group of target endpoints. Thus, the merged target endpoint includes all departure events included in the group of endpoints being merged.

Merging the group of target endpoints also comprises merging transfers from common source endpoints to target endpoints included in the group. For example, if two given target endpoints Y1, Y2 to be merged are connected by transfers from a common source endpoint X, the transfers are merged so that a single transfer is defined from X to the merged target endpoint Y.

When merging a group of target endpoints, the interval of acceptable transfer durations for a merged transfer is defined by the intersection of the sets of acceptable transfer durations for the transfers to be merged. Thus, an interval of acceptable values for the merged transfer from X to Y is obtained by intersecting the interval of acceptable transfer durations for the X to Y1 transfer with the interval of acceptable transfer durations for the X to Y2 transfer.

Once the target groups have been merged, the system proceeds to determine groups of one or more source endpoints to be merged. The system looks for incompatibilities between source endpoints, e.g: using the same conditions as for target endpoints. That is, source endpoints S1 and S2 are considered incompatible if there exists a target endpoint T such that the interval of acceptable transfer durations for the S1 to T transfer and the S2 to T transfer do not intersect. It will be understood that the target endpoint T may be a merged endpoint formed during merging of the target groups as described above.

The system iterates over all pairs of source endpoints, checks whether they are incompatible and thus builds an incompatibility graph, in which vertices are source endpoints and edges are incompatibilities. The system carries out a graph coloring on this graph of incompatibilities to provide an assignment from source endpoints to groups of compatible source endpoints.

Merging a group of two or more source endpoints to form a merged source endpoint comprises merging the arrival events included in the group of target endpoints. That is, the merged source endpoint includes all arrival events included in the group of source endpoints being merged.

Merging the group of source endpoints also comprises merging transfers from source endpoints to common target endpoints. For example, if two given source endpoints A1, A2 to be merged are connected by transfers to a common target endpoint B, the transfers are merged so that a single transfer is defined from the merged source endpoint A to the common target endpoint B.

When merging a group of source endpoints, the interval of acceptable transfer durations for a merged transfer is defined by the intersection of the sets of acceptable transfer durations for the transfers to be merged. Thus, an interval of acceptable values for the merged transfer from A to B may be obtained by intersecting the interval of acceptable transfer durations for the A1 to B transfer and the interval of acceptable transfer durations for the A2 to B transfer.

In this way, the system assigns departure and arrival events to endpoints, and assigns transfer times for transfers so that the feasibility or non-feasibility of transfers is respected. Arrival and departure events are organised into endpoints in an efficient way to keep the number of transfer endpoints in the transit transfer network as low as possible. This compression of the transit transfer network improves performance of transit directions applications which incorporate the systems and methods described herein, since performance of such applications may depend on the size of the transit transfer network.

Referring now to FIG. 1, there is shown a high level block diagram of a system in accordance with one embodiment of the present invention. A transit directions system 2 responds to queries from a user client 1 to provide route planning information to the user in response to a query for an optimum route between a start location and a target destination, for example for a particular start time or arrival time.

As shown in FIG. 1, the transit directions system 2 comprises a number of processing modules. It will be appreciated that the term "module" refers to computer logic utilised to provide specified functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM hard disk or optical or magnetic media.

Also, it will be appreciated that embodiments of the system 2 can have different or other modules to the ones described herein, with the described functionalities distributed amongst the modules in a different manner.

In one embodiment, the transit directions system 2 is in communication with a client 1 via a network 3, which is typically the internet, but can also be any network, including but not limited to any combination of a LAN, a WAN, a mobile, wired or wireless network, a private network, or a virtual private network. While only a single client 1 is shown, it is understood that very large numbers (e.g., millions) of clients are supported and can be in communication with the transit directions system 2 at any time. Examples of client devices 1 are personal computers, digital assistants, personal digital assistants, cellular phones, mobile phones, smart phones or laptop computers.

As shown in FIG. 1, transit directions system 2 comprises a front end interface 4 which receives transit queries from the client 1. The received query is communicated to a query resolution module 5 to fulfil the query. As shown, the transit directions system 2 also includes a transit information interface 6 which receives transit data including schedule information as published by different public transportation service providers such as rail transport systems providers, bus companies and the like.

Referring to FIG. 1, the transit directions system 2 includes a pre-computation module 7, which performs a pre-computation process on the transit data prior to query time. The pre-computation module 7 includes a transit graph module 8 which forms the transit graph from the transit data. The transit graph module 8 analyzes the transit data to determine events taking place during trips specified in the transit data. As described in US 2011/0112759, the transit graph module 8 places station and onboard nodes in the transit graph and connects the nodes with boarding, transit and waiting arcs, based on the transit data. More detail regarding station nodes, onboard nodes and the arcs which may be formed between them can be found in US 2011/0112759.

In some embodiments, the pre-computation module 7 may also include modules to processes transit information to determine optimal transfer patterns that describe routes between any two transit stations, as described in US 2011/0112759. When a user wishes to plan a journey using the system, they may utilise client 1 to send a query through network 3 to the front end interface 4 which supplies the query to the query resolution module 5, which uses the pre-processed optimal transfer patterns provided by the pre-computation module to determine the optimal trip or trips. Reference is directed to US 2011/0112759 for a description of the use of pre-processed optimal transfer patterns to determine optimal trip or trips.

Those skilled in the art will appreciate that in some embodiments, the query resolution module 5 may interrogate the query graph directly in response to a user query. Various methodologies for directly querying the transit graph will be evident to those skilled in the art, for example by way of Dijkstra's algorithm.

As shown in FIG. 1, the pre-computation module 7 also includes a transit transfer network module 9. The transit transfer network module 9 processes transit data to form a transit transfer network which represents and stores information relating to transfers between vehicle arrival and departure events in an efficient way. More specifically, the transit transfer network module 9 performs a conflation process which efficiently groups departure and arrival events extracted from the transit data into nodes of a directed graph. The nodes of the graph are referred to herein as "transfer endpoints". Each transfer endpoint corresponds to a set of one or more transit vehicle departure or arrival events, around a particular location. The transit transfer network module 9 also defines transfers relating to the endpoints. Each transfer connects an endpoint to another endpoint or, in some embodiments, connects an endpoint to itself, and has an associated transfer time. Those skilled in the art will appreciate that the transit transfer network may be represented and stored in a data store 10 of transit directions system 2 as an adjacency list.

Figure 2:
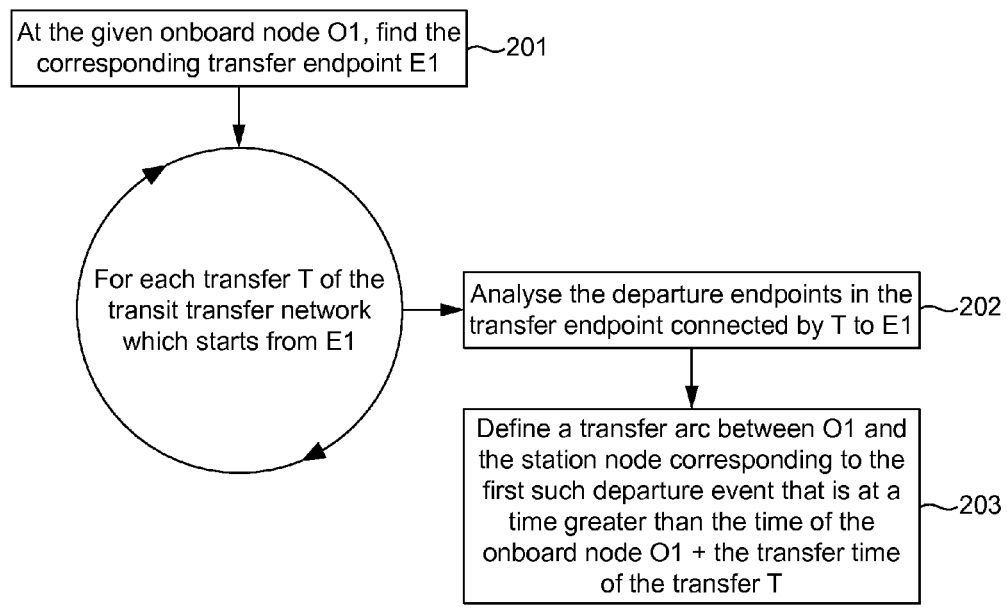
FIG. 2 illustrates a process to determine transfer arcs in a transit graph.

The transit transfer network is used to determine the transfer arcs between onboard and station nodes of the transit graph. To this end, the pre-computation module 7 includes a transfer arc module 11 configured to determine transfer arcs between nodes of the transit graph. FIG. 2 illustrates a process carried out by the transfer arc module 11 to determine the transfer arcs. As shown, determining transfer arcs from a given onboard node O1 of the transit graph comprises a step 201 of identifying an endpoint E1 (e.g: a source endpoint) which contains an arrival event corresponding to the onboard node O1. Then, for each transfer T which starts from the endpoint E1, the transfer arc module 11 analyses 202 the departure events in the (e.g: target) endpoint connected to endpoint E1 by transfer T and defines 203 a transfer arc which connects the onboard node O1 to a station node corresponding to the first such departure event that is at a time greater than the time of the onboard node O1 plus the transfer time of the transfer T.

Transit graph transfer arcs may be generated "on the fly", e.g: during the pre-processing of transit information to determine transfer patterns prior to query time. Alternatively, transfer arcs may be added to the transit graph before the transfer patterns are determined. In embodiments in which the transit graph is interrogated directly to determine an optimal route, the transfer arcs may be added to the transit graph prior to query time, or alternatively "on the fly" as the query is performed.

The transit transfer network module 9 may be configured to update the transit transfer network at regular intervals, e.g: daily, or bi-weekly by constructing it based on the latest received transit data. In this way the transit transfer network is kept updated and reflects changes to the transit data.

Transit Transfer Network Module

As shown in FIG. 1, the transit transfer network module 9 includes a walking transfers module 100, an initial endpoint definition module 102, an interval calculation module 103, an incompatibilities module 104, a graph coloring module 105, a conflation module 106 and a final processing module 107. Those skilled in the art cognizant of the present disclosure will recognise that the transit transfer network module 9 may include other modules in different embodiments of the present invention.

Figure 3:
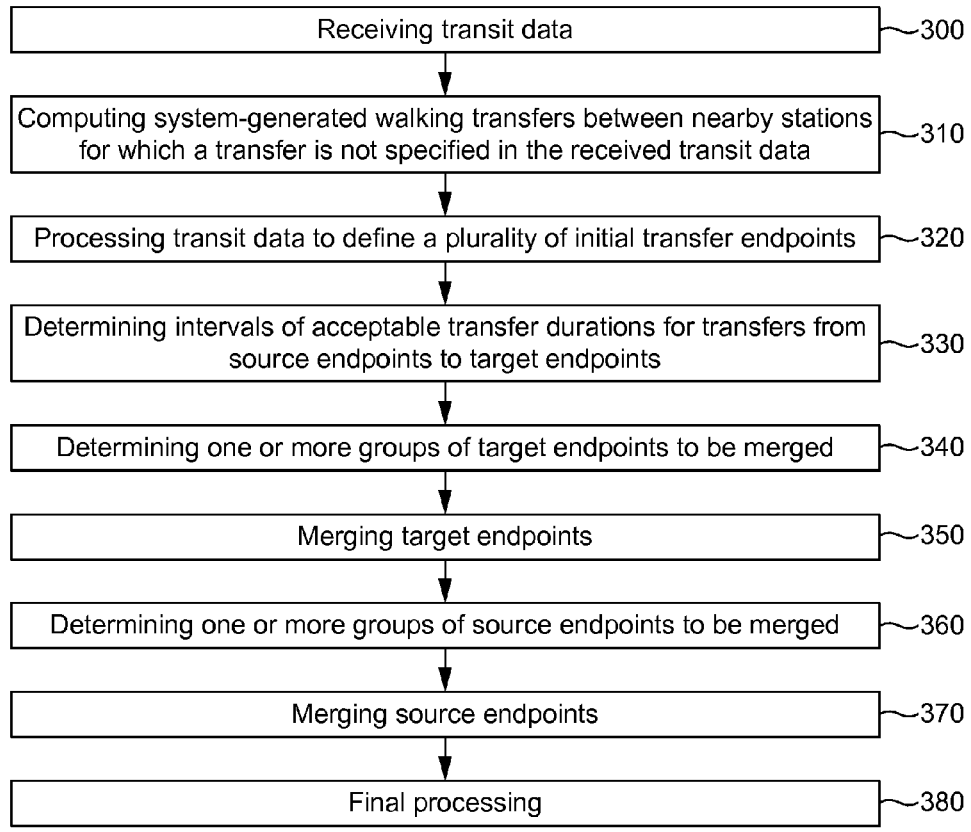
FIG. 3 is an illustrative example of a process for constructing a transit transfer network.

Referring to FIG. 3, in one embodiment the construction of the transit transfer network comprises the following functional steps:

300: Receiving transit data;
310: Computing system-generated walking transfers between nearby stations for which a transfer is not specified in the received transit data;
320: Processing transit data to define a plurality of initial transfer endpoints and associated transfers;
330: Determining intervals of acceptable transfer durations for transfers from source endpoints to target endpoints;
340: Determining one or more groups of target endpoints to be merged based on sets of acceptable transfer durations;
350: Merging target endpoints
360: Determining one or more groups of source endpoints to be merged based on sets of acceptable transfer durations;
370: Merging source endpoints
380: Final processing Receiving Transit Data As described above, transit directions system 2 includes a transit information interface 6 which receives transit data from one or more public transportation service providers. This information is processed by the transit transfer network module 9 to form the transit transfer network.

In one example, each agency providing transit data is in communication with the transit directions system 2 to provide the transit data in a specified format such as the General Transit Feed Specification (GTFS) described at http://code.google.com/transit/spec/transit_feed_specification.html The GTFS specification allows an agency to specify "stops", "routes" and "trips". In the GTFS specification, a "stop" is defined as an individual location where vehicles pick up or drop off passengers. A "trip" is defined as a sequence of two or more stops, each stop having a departure and arrival time (which may be the same or different times). A "route" is defined as a group of trips that are displayed to riders as a single service.

The GTFS specification also allows an agency to define transfer rules for transfers between stops (see the description of the transfer_type field in https://developer.google.com/transit/gtfs/reference#transfer_fields) Agencies can specify preferred transfers (also called recommended transfers), timed transfers (also called safe transfers), impossible transfers, and also minimum time transfers which specify a certain minimum amount of time for the transfer.

It has been proposed to augment the GTFS definition to also allow agencies to specify transfers between specific routes or between trips for a given stop pair, without having to specify the same transfer for all the trips of that stop pair. To this end, it has been proposed to add 4 optional fields to the transfers.txt file of the GTFS definition: from_route_id, to_route_id, from_trip_id and to_trip_id.

The from_route_id and to_route_id fields can contain a route identifier, reducing the scope to which the given transfer applies. If from_route_id is specified, the transfer will only apply to the arriving trip with the given route identifier, at the given from_stop_id. If to_route_id is specified, the transfer will only apply to the departing trip with given route identifier, at the given to_stop_id.

The from_trip_id and to_trip_id fields can contain a trip identifier. If from_trip_id is given, from_route_id is ignored, and if to_trip_id is given, to_route_id is ignored. If from_trip_id is specified, the transfer will only apply to the arriving trip with the given trip identifier, at the given from_stop_id. If to_trip_id is specified, the transfer will only apply to the departing trip with the given trip identifier, at the given to_stop_id.

For example in the BART transit feed, the stop "MacArthur" is split into two stops with ids MCAR and MCAR_S. BART routes with ids 01 (PITTSBURG/BAY POINT TO SFIA-MILLBRAE) and 04 (RICHMOND TO FREMONT) go through MCAR_S, and the remaining routes go through MCAR. The agency has specified a timed transfer between MCAR_S and MCAR_S for these two routes. With the new proposal, instead of splitting the station into two stops, the agency could have a single stop for MacArthur station, and include the following details in the transfers.txt part of the augmented GTFS specification:

from_stop_id,to_stop_id,from_route_id,to_route_id
MCAR,MCAR,01,04
MCAR,MCAR,04,01

In this way, improved flexibility is provided for agencies to specify transfers at different levels of specificity, e.g: between stops, between routes, between trips, or between a stop and a trip, a route and a trip etc.

Computing System-Generated Walking Transfers Between Nearby Stations for which a Transfer is not Specified in the Received Transit Data Although transfers may be defined in the transit information received by the transit interface 6, the transit information may be augmented by walking transfers module 100, which generates additional transfers. The walking transfers module 100 adds a transfer between any stop pairs having a walking distance (or walking time) less than a predetermined threshold (e.g: less than 200-300 m). The walking distance/time between stops may be obtained by querying a walking route planner (e.g: Google walking directions, Microsoft Bing walking directions, or Google Maps indoor walking route planner). The walking transfers module 100 also associates a transfer time to the transfer, which is set equal to the walking time. It will be understood that the transfer time is fixed and does not change depending on time.

As used herein, the term "system-generated transfers" refers to transfers generated by the system 2, e.g: by the walking transfers module 100, and the term "transfer data" refers to information relating to transfers, including system-generated transfers and also transfers specified in the transit data received at transit interface 6.

Defining Initial Endpoints

The transit transfer network module 9 includes an initial endpoint definition module 102 which determines initial transfer endpoints.

The initial endpoint definition module 102 extracts departure and arrival events for which a transfer is defined in the transfer data. The module 102 groups these events into initial transfer endpoints such that no event is assigned to more than one endpoint.

In some embodiments, the initial transfer endpoints are formed such that each initial transfer endpoint includes only arrival event(s), or only departure event(s). That is, an initial endpoint may comprise a single arrival event, a group of two of more arrival events and no departure events, a single departure event, or a group of two or more departure events and no arrival events. Transfer endpoints comprising only arrival event(s) are referred to herein as "source endpoints". Transfer endpoints comprising only departure event(s) are referred to herein as "target endpoints".

Various methodologies are envisaged for defining the initial endpoints. In one embodiment, the initial endpoints may be constructed so that each transfer endpoint includes only one arrival event or only one departure event. In other words, each arrival event for which a transfer is defined may be included in a single source endpoint, and each departure event for which a transfer is defined may be included in a single target endpoint. Transfers between the initial endpoints may be defined corresponding to the transfers specified in the transfer data.

In an alternative implementation, initial endpoints may be defined to include a plurality of events to which transfers that are defined in the transfer data apply. For example, if a transfer between stops A and B is generated by walking transfers module 100, then endpoints E1 and E2 may be defined to respectively include all arrival events relating to stop A and all departure events relating to stop B. A transfer between endpoints E1 and E2 may be defined to represent the common transfers between the arrival and departure events included in the endpoints E1 and E2.

In some embodiments, initial endpoints are constructed based on the level of specificity of transfers given in the transfer data. For example, if the module 102 identifies that the transfer data specifies that there is a transfer connecting an arrival event for Stop S, Line A, Trip 1, a source endpoint E1 is created including the stop S, Line A, Trip 1 event. If the module 102 identifies that the transfer data specifies that there is a further (different) transfer connecting all other Stop S, Line A arrival events that are different from Trip 1, another source endpoint E2 is created including the other Stop S, Line A arrival events. If the module 102 identifies that the transfer data specifies that there is a still further (different again) transfer connecting all other Stop S arrival events (ie: all events which are not Line A events), the module 102 creates another source endpoint E3 including the relevant events.

Thus, a trip of line B arriving at station S will be attributed the endpoint E3. Trip 2 of line A arriving at station S will be attributed to the endpoint E2. Trip 1 of line A arriving at station S will be attributed the endpoint E1.

Thus, it is understood that for each arrival/departure of a trip, the initial endpoint definition module 102 may determine the most accurate (ie: the most specific) endpoint that describes this arrival/departure, and includes the arrival/departure in this endpoint.

In an embodiment, transfers between endpoints may be calculated based on the specificity of endpoints. For example, if the events in an endpoint are specific to a particular stop, route and trip, the endpoint may be given a specificity value of 2. If the events in an endpoint are specific to a particular stop and route, the endpoint may be given a specificity value of 1. If the events in an endpoint are specific to a particular stop, the endpoint may be given a specificity value of 0. Transfers specified in the transfer data are also given a specificity corresponding to the sum of the specificities of the endpoints that they apply to (thus for example a system-generated transfer between stops has specificity 0). The transfers are analysed in decreasing order of specificity, and for all pairs of endpoints for which the transfer applies and such that no more specific transfer has been applied before, the system applies that transfer to that pair of endpoints.

For example, in the case of 3 source endpoints: S1, S1+R1, S1+R1+T1 (respective specificity 0, 1, and 2), and 3 target endpoints S2, S2+R2, S2+R2+T2 (respective specificity 0, 1, and 2), and 4 possible transfers t1: S1+R1+T1 to S2+R2+T2 (specificity 4), t2: S1+R1+T1 to S2 (specificity 2), t3: S1 to S2+R2 (specificity 1) and t4: S1 to S2 (specificity 0):

Transfer t1 applies between S1+R1+T1 and S2+R2+T2;

Transfer t2 applies between S1+R1+T1 and S2+R2, and between S1+R1+T1 and S2;

Transfer t3 applies between S1+R1 and S2+R2+T2, between S1+R1 and S2+R2, between S1 and S2+R2+T2, and between S1 and S2+R2; and Transfer t4 applies between S1+R1 and S2, and between S1 and S2.

Determining Intervals of Acceptable Transfer Durations for Transfers Between Endpoints The transit transfer network module 9 also includes an interval calculation module 103, which assigns an interval of acceptable values for the transfer duration of each transfer between source and target endpoints, such that the feasibility or non feasibility of transfers given in the transfer data is respected. This will now be explained in more detail with reference to three examples.

Example 1

Figure 4:
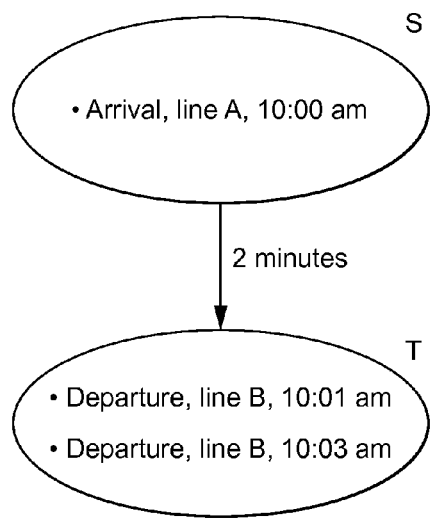
FIG. 4 shows exemplary source and target transfer endpoints.

An exemplary determination of an interval of acceptable transfer durations will now be provided with reference to FIG. 4, which shows a source endpoint S and a target endpoint T. As shown, endpoint S includes an arrival event in which line A arrives at stop S at time 10:00 am. Endpoint T includes a departure event in which line B departs from stop S at time 10:01, and a departure event in which line B departs from stop S at time 10:03. The transfer data specifies that a transfer from line A to line B at stop S takes 2 minutes.

The transfer from the arrival of line A at 10:00 to the departure of line B at 10:03 is feasible because the time between the events is greater than the transfer time.

However, the transfer the arrival of line A at 10:00 to the departure of line B at 10:01 is not feasible because there is not enough time between the events to make the transfer.

Thus, the feasibility of a transfer from an arrival event to a departure event depends on the transfer time between the events as specified in the transfer data.

It should be noted that although the transfer time from line A to line B is specified in the transfer data as 2 minutes, there would still be enough time to make the transfer from the arrival of line A at 10:00 am to the departure of line B at 10:03 am if the transfer time were as high as 3 minutes (180 seconds). If the transfer time were higher than this, the transfer would not be feasible. Therefore, to ensure that the feasibility of the transfer is respected, 180 seconds is determined as the upper bound for the interval of acceptable transfer durations for the transfer from the source endpoint S to the target endpoint T.

Similarly, it should be noted that the non-feasibility of the transfer from the arrival of line A at 10:00 am and the departure of line B at 10:01 am would be respected if the transfer time were as low as 61 seconds. If the transfer time were 60 seconds or less, the transfer would become feasible. Therefore, to ensure that the non-feasibility of the transfer is respected, 61 seconds is determined as the lower bound for the interval of acceptable transfer durations for the transfer from the source endpoint S to the target endpoint T.

Therefore, the interval of acceptable values for the transfer between S and T is determined to be [61 seconds, 180 seconds].

Example 2

Consider a source endpoint consisting of an arrival event at Zurich HB at 14:00, and a target endpoint consisting of a departure event at Bahnhofplatz at 14:05. The transit data specifies that the transfer between the arrival and departure is a safe transfer, for which the transfer duration is taken to be zero. The transfer from this source endpoint to this target endpoint gets the interval of acceptable durations [0, 5 minutes], because any transfer time in that interval will allow a passenger to transfer.

Example 3

Figure 5A:
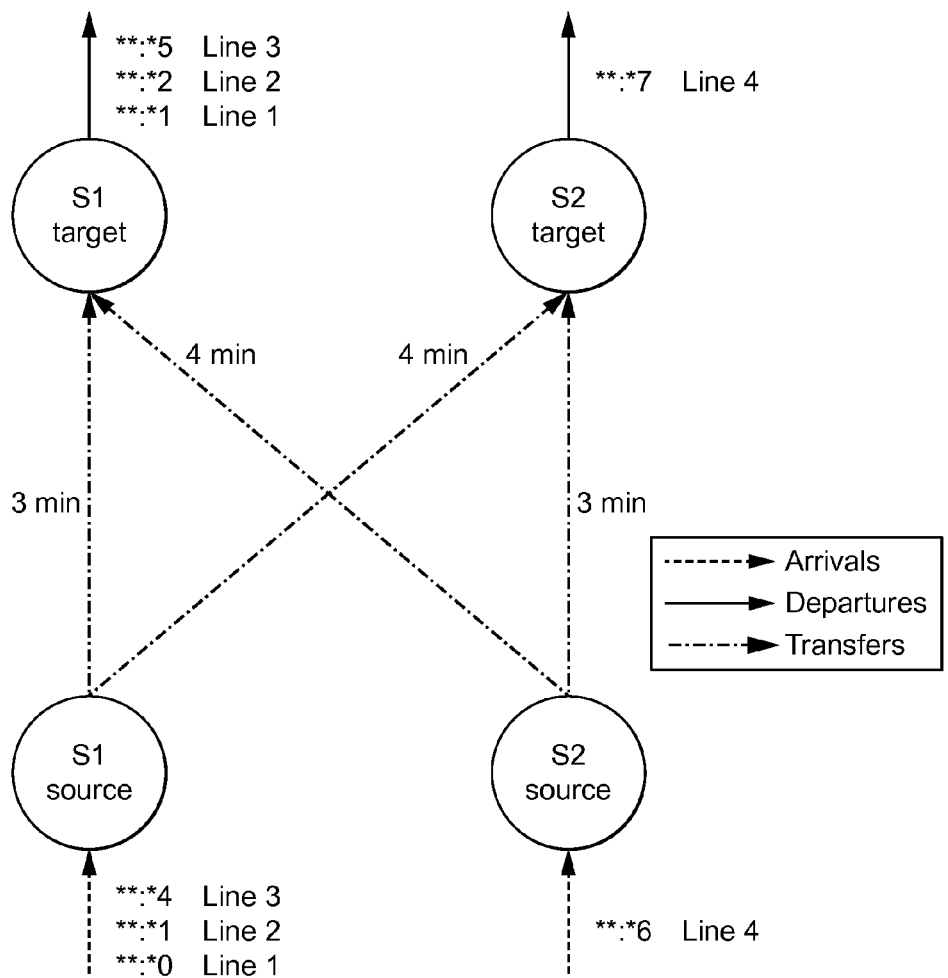
FIG. 5(a) shows four exemplary transfer endpoints.

An exemplary determination of intervals will now be provided with reference to FIG. 5a, which illustrates an example involving two stops, S1 and S2, and four transfer endpoints: (S1, source), (S1, target), (S2, source) and (S2, target). The transfer data specifies that 3 minutes are need to make a transfer within both stops (e.g: between different platforms in the same station), while 4 minutes are needed to transfer from one to the other.

As shown in FIG. 5a, three lines go through stop S1. Line 1 arrives every ten minutes, at 00:00, 00:10, 00:20 etc, and departs one minute later, at 00:01, 00:11, 00:21 etc. Line 2 arrives every ten minutes, at 00:01, 00:11, 00:21 etc, and departs one minute later, at 00:02, 00:12, 00:22 etc. Line 3 arrives every ten minutes, at 00:04, 00:14, 00:24 etc, and departs one minute later, at 00:05, 00:15, 00:25 etc.

Station S2 has only one line, line 4, which arrives every ten minutes, at 00:06, 00:16, 00:26 etc, and departs one minute later, at 00:07, 00:17, 00:27 etc.

Figure 5B:
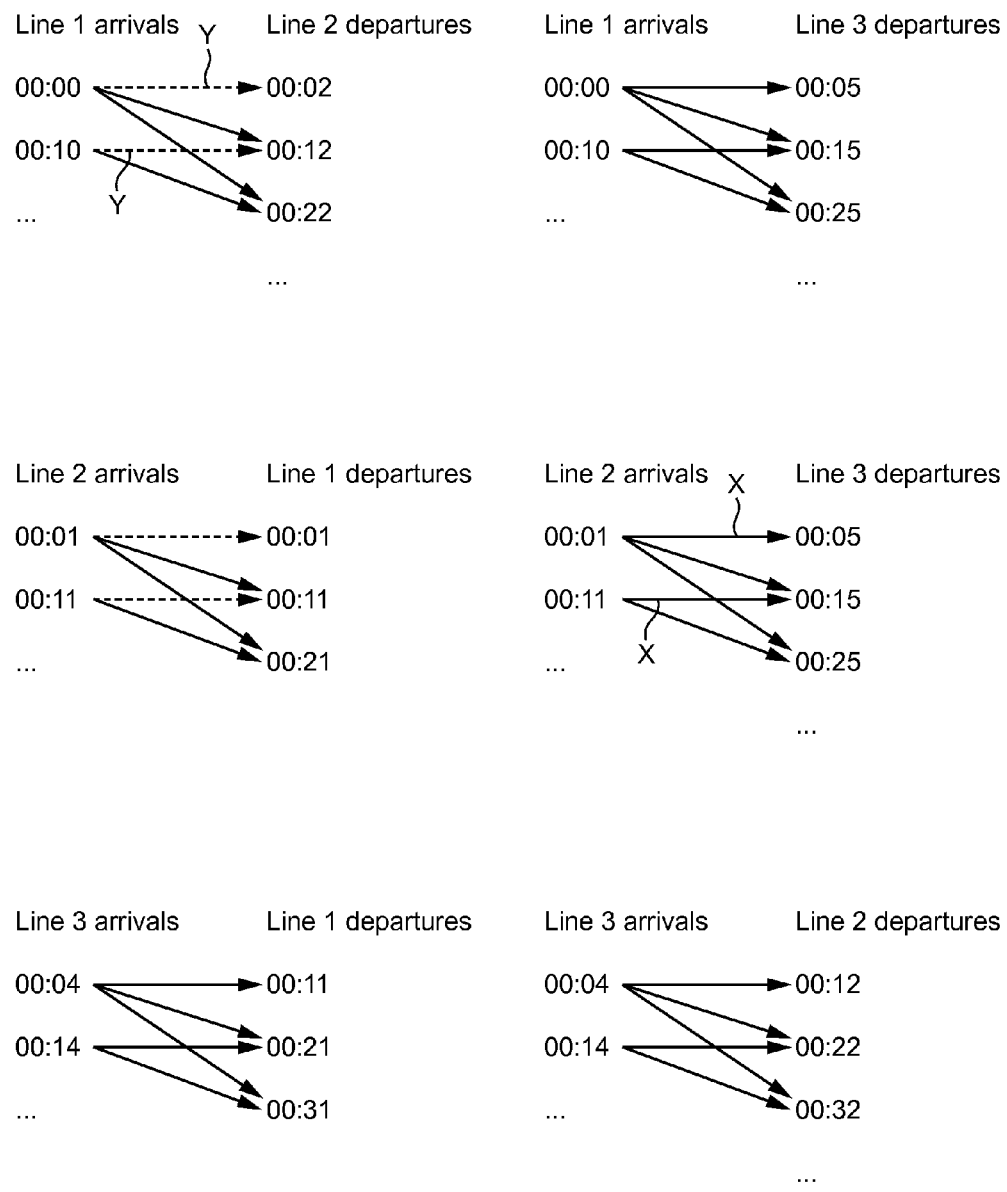
FIG. 5(b) illustrates feasible and non-feasible transfers.

FIG. 5b illustrates feasible and non-feasible transfers between different lines for the (S1, source)→(S1, target) transfer. Feasible transfers are shown in solid lines, and non-feasible transfers are shown in dotted lines.

It can be seen that the feasible transfers remain feasible for transfer times of four minutes or less. This is because if the transfer time is more than four minutes, the transfers marked "X" becomes non-feasible.

Similarly, it can be seen that the non-feasible transfers remain non-feasible for transfer times of more than two minutes. This is because if the transfer time is two minutes or less, the transfer marked "Y" becomes feasible.

Therefore, the interval for the (S1, source)→(S1, target) transfer is [121 seconds, 240 seconds].

More generally, the algorithm deals with duration between arrivals and departures, ignoring durations between arrival and departure of the same vehicle. In the case of a specified transfer of duration D or safe transfer (in which case D=0), if m is the maximum duration between an arrival and a departure such that m<D, and M is the maximum duration between an arrival and a departure such that M>=D, the output interval will be [m+1, M]; ie: for any transfer duration between m+1 and M, exactly the same set of transfers will be possible as specified by the input.

Applying this to the other transfers shown in FIG. 5a one obtains the following intervals:
(S1, source)→(S2, target): [181, 360]
(S2, source)→(S2, target): [0, 660]
(S2, source)→(S1, target): [0, 300]

Many modifications to the schemes for determining intervals of acceptable transfer durations are possible. For example, when generating intervals of acceptable values from arrival/departure times, in some embodiments system-generated walking transfers may be ignored if the walking time of the transfer is too close to the difference between the departure time and arrival time (e.g: if the walking time of the transfer is different to the departure time minus the arrival time by less than a predetermined value). This forces certain intervals to be larger to take into account that calculated walking times are approximations for the actual time that a person may take to walk between locations.

Determining One or More Groups of Target Endpoints to be Merged:

In an embodiment, determining groups of endpoints to be merged comprises determining incompatible endpoints. To this end, the transit transfer network module 9 includes an incompatibilities module 104 which identifies incompatible endpoints. A pair of target endpoints T1, T2 are considered incompatible if these exists a source endpoint S such that the intervals of acceptable transfer durations from S to T1 and from S to T2 do not intersect, ie: there is no acceptable transfer duration that would suit both the transfer S→T1 and S→T2. The incompatibilities module 104 iterates over all pairs of target endpoints, checks whether they are incompatible, and builds an incompatibility graph, in which vertices are target endpoints and edges are incompatibilities.

The graph coloring module 105 carries out a graph coloring on the graph of incompatibles. Graph coloring is well known per se to those skilled in the art and will not be described in detail herein. Briefly, a graph coloring involves assigning a "color" to each node of a graph such that no two adjacent nodes share the same color. Those skilled in the art will be aware of various algorithms (e.g: heuristic algorithms) for carrying out a graph coloring.

The graph coloring gives an assignment from target endpoints to groups of target endpoints which are not incompatible. This is because each color in the graph coloring represents a different group of target endpoints which are not incompatible. In an embodiment, the system merges compatible endpoints in each group as described in more detail below.

It will be understood that in various embodiments, other conditions and/or exceptions may also be applied in the determination of compatibility or incompatibility of endpoints. For example, a pair of endpoints relating to different stops may be deemed incompatible if the straight line distance between the stops is greater than a predetermined threshold, e.g: greater than 50 m. In some implementations, two target endpoints may be deemed incompatible if there is a source endpoint for which a transfer is defined to one of the target endpoints but not to the other. That is, in some embodiments, a pair of target endpoints may be considered compatible only if each source endpoint which connects to one of the target endpoints also connects to the other. However, in some embodiments, an approximation may be made in which two target endpoints are considered compatible when one of them is linked to a source endpoint by a system generated walking transfer but the other is not so linked because the walking transfers module 100 has determined that the distance from the source endpoint is greater than the predetermined walking distance threshold discussed above. If compatibility between endpoints is desired in certain cases, transfers associated with one or more of the endpoints may be assigned an interval of acceptable transfer values of [0, infinity].

Merging Target Endpoints

As discussed above, in an embodiment, the transit directions system 2 determines one or more groups of endpoints which are not incompatible and merges endpoints in the group. The transit directions system 2 comprises a conflation module 106 configured to merge target endpoints in each group to form one or more merged endpoints.

Merging a group of two or more target endpoints to form a merged target endpoint comprises merging the departure events included in the group of target endpoints. Thus, the merged target endpoint includes all departure events included in the group of endpoints being merged.

Merging the group of target endpoints also comprises merging transfers from common source endpoints to target endpoints included in the group. The interval of acceptable transfer durations for a merged transfer is defined as the intersection of the intervals of acceptable transfer durations for the transfers to be merged.

For each target endpoint, the adjacency list defines a list of source endpoints which connect to that target, with the corresponding interval. In an embodiment, merging target endpoints comprises merging the adjacency lists of the endpoints being merged, and intersecting the respective intervals.

Figure 5C:
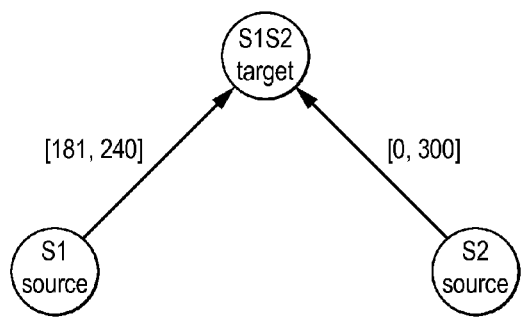
FIG. 5(c) shows the endpoints of FIG. 5(a) after merging of the target endpoints.

As an example, consider the merger of target endpoints (S1, target) and (S2, target) shown in FIG. 5a, supra, to form a new target endpoint (S1S2, target). The transfer from (S1, source)→(S1 target) is merged with the transfer from (S1, source)→(S2, target) to form a merged transfer from (S1, source)→(S1S2, target). The interval for the merged transfer is [181, 240], since this is the intersection of [121,240] and [181, 360]. Similarly, the transfer from (S2, source)→(S1 target) is merged with the transfer from (S2, source)→(S2, target) to form a merged transfer from (S2, source)→(S1S2, target). The interval for the merged transfer is [0, 300], since this is the intersection of [0,300] and [0, 660]. FIG. 5(c) shows the merged target endpoint S1S2, together with merged transfers and corresponding intervals.

Figure 6A:
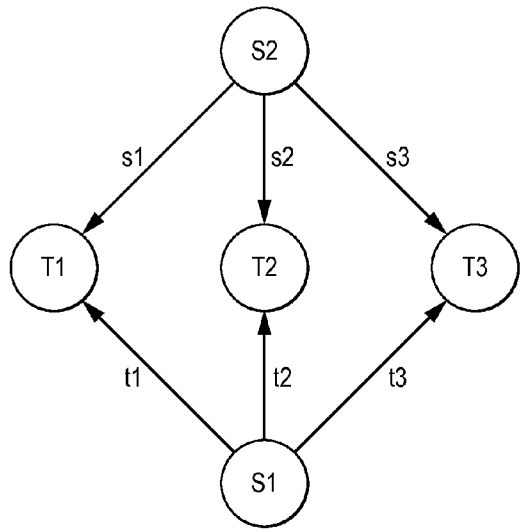
FIG. 6(a) shows a group of three target endpoints to be merged, and associated source endpoints.
Figure 6B:
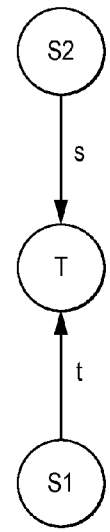
FIG. 6(b) shows a merged target endpoint, and associated source endpoints.

As a further example, FIG. 6(a) shows target three endpoints T1, T2 and T3 in a group to be merged into a single target endpoint T, which is shown in FIG. 6(b). As shown, a common source endpoint S1 connects all three endpoints T1, T2 and T3 by respective transfers t1, t2 and t3. Also, a common source endpoint S2 connects all three endpoints T1, T2 and T3 by respective transfers s1, s2 and s3. The transfers t1, t2 and t3 are merged to form a transfer t from S1 to the merged endpoint T, and the transfers s1, s2, s3 are merged to form a transfer s from S2 to T, as shown in FIG. 6(b). The interval of acceptable transfer durations for the transfer t from S1 to T is set equal to the intersection of the intervals of acceptable transfer durations for the t1, t2 and t3 intervals. Similarly, the interval of acceptable transfer durations for the transfer s from S2 to T is set equal to the intersection of the intervals of acceptable transfer durations for the s1, s2 and 53 intervals.

It is to be noted that since T1, T2 and T3 are in the same group of the graph coloring, the three intervals t1, t2, t3 for the transfers from S1 have a non-empty pairwise intersection. It is a general mathematical fact that a set of intervals having non-empty pairwise intersections has a non-empty intersection. Therefore, since T1, T2 and T3 are in the same group of the graph coloring, the intersection of the three intervals t1, t2, t3 is non-empty.

Regarding the transfers from S2, the intersection of the intervals of acceptable transfer durations for the three intervals s1, s2 and s3 is non-empty for the same reason. That is, since T1, T2 and T3 are in the same group of the graph coloring, s1, S2 and s3 have a non-empty pairwise intersection, and therefore it follows that the intersection of the three intervals is non-empty.

It will be appreciated that in some cases the merged interval may not include the duration D of the transfers given in the transfer data. For example, if S→T1 has interval [1,4] with D=2, and S→T2 has interval [2,6] with D=6, then upon merging T1 and T2, the interval from S→T has interval [3,4], and neither of the two D values are in the resulting interval.

Determining One or More Groups of Source Endpoints to be Merged

In various embodiments, determining of groups of source endpoints to be merged follows the procedure described above in relation to target endpoints. The incompatibilities module 104 looks for incompatibilities between source endpoints, whereby a pair of source endpoints S1, S2 are considered incompatible if there exists a w target endpoint T such that the intervals of acceptable transfer durations from S1 to T and for S2 to T do not intersect. The graph coloring module 105 then carries out a graph coloring on the graph of incompatibilities, which gives an assignment from source endpoints to groups of compatible source endpoints.

Further conditions/exceptions which may in some implementations be applied in the determination of compatible/incompatible source endpoints are discussed above in relation to target endpoints.

Merging Source Endpoints

The conflation module 106 then merges source endpoints in each group to form one or more merged endpoints. Merging source endpoints follows the same procedure described above in relation to target endpoints. More specifically, merging source endpoints comprises merging arrival events in the group of source endpoints such that the merged source endpoint includes all arrival events included in the group of endpoints to be merged. Merging source endpoints also includes merging transfers from source endpoints included in the group to common target endpoints. The interval of acceptable transfer durations for a merged transfer is defined to include the intersection of the sets of acceptable transfer durations for the transfers to be merged.

Figure 7:
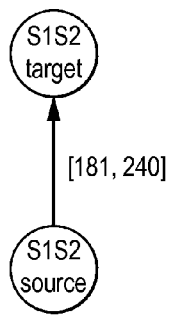
FIG. 7 shows the endpoints of FIG. 5(c) after merging of the source endpoints.

As an example, consider the merger of source endpoints (S1, source) and (S2, source) shown in FIG. 5(c), discussed supra, to form a new source endpoint (S1S2, source). The transfer from (S1, source)→(S1S2 target) is merged with the transfer from (S2, source)→(S1S2, target) to form a merged transfer from (S1S2, source)→(S1S2, target). The interval for the merged transfer is [181, 24], since this is the intersection of [181,240] and [0, 300]. This is shown in FIG. 7.

After merging source and target endpoints in this way, there is still a non-empty interval of acceptable durations for each transfer between source and target endpoints.

Final Processing

The final processing module 107 carries out final processing to form the transit transfer network.

Optionally, the final processing module 107 may select pairs of source and target endpoints to merge to form a merged endpoint including both source and target events. Since events in the merged endpoint have shared properties with respect to transfers, such a merged endpoint may be referred to as a "transit graph station". It will however be appreciated that there may be differences between the set of events in such a merged endpoint and the departure and arrival events at an actual (ie: physical) public transportation station. For example, in some cases events at two or more nearby physical stations may be included in a merged endpoint. In addition, the events at a physical public transportation station may be split between endpoints if the trips do not have the same properties with respect to transfers, for example if some trips at a station wait for connections but others do not.

As an example, an endpoint in the form of a transit graph station may be formed by:

A train leaving Zurich HB at 14:00;

A bus arriving at Bahnhofplatz (a nearby stop) at 19:05; and

A tram arriving at Bahnhofstrasse at 07:30

It will be appreciated also that the source and target endpoints which are merged to form a transit graph station endpoint may themselves be merged endpoints formed by the source and target merging steps discussed above.

Various schemes are envisaged for selected pairs of source and target endpoints to merge to form an endpoint in the form of a transit graph station. For example, pairs of source and target endpoints to merge may be selected based on the walking distance between endpoints. The walking distance between endpoints may be calculated between "center of mass" coordinates determined for the endpoints, which may for example be determined by averaging the coordinates of each event in the endpoint. In an embodiment, the walking distance is calculated between all pairs of source and target endpoints and then the pairs are sorted by distance to form a list. The module 107 iterates through the list starting from the pair with the shortest distance, and merges the current pair if neither endpoint in the pair has already been merged into a transit graph station.

Figure 8:
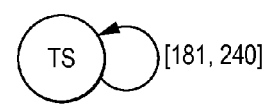
FIG. 8 shows an endpoint obtained by merging the source and target endpoints of FIG. 7.

When a source and target endpoint are merged to form an endpoint in the form of a transit graph station, a transfer is defined which connects the merged endpoint to itself. An interval of acceptable values for the transfer connecting the merged endpoint to itself is set equal to the interval for the transfer between the source and target endpoint. This is shown in FIG. 8, which illustrates a merged endpoint TS, which is a transit graph station formed by merging the source and target endpoints of FIG. 7.

Further transfers from/to the merged endpoint may also be defined based on the transfers defined for the endpoints being merged. For example, if a first pair of endpoints S1 and T1 are merged to form TS1, and a second pair of endpoints S2 and T2 are merged to form TS2, and there is an interval i1 for a connection between S1 and T2, and an interval i2 for a connection between S2 and T1, a connection is defined between TS1 and TS2 with interval i1, and a connection between TS2 and TS1 is defined with interval i2.

It will be understood that in some embodiments, source and target endpoints may not be merged. In such examples, each endpoint of the transit transfer network comprises either only departure events or only arrival events.

The processing carried out by final processing module 107 may also comprise selecting a value from the interval of acceptable values for each transfer in the transit transfer network. In an embodiment, the highest value in the interval is selected for each transfer.

Splitting Transit Data into Smaller Geographically-Based Clusters

In various embodiments of the invention, all or part of the process of FIG. 3 may be carried out on a selected subset of the transit data received at the transit interface 6. Those skilled in the art, cognizant of the present disclosure, will appreciate that the process, or parts of the process, may be carried out repeatedly (or simultaneously) on different local sets to form the transit transfer network.

For example, in an embodiment, the system 2 splits the transit data into smaller geographically-based clusters (ie: local sets). Each of these clusters, and the arrival/departure associated events associated with it, may then be treated separately.

Various methodologies are envisaged for partitioning the transit data in this way. For example, the events may be split by station: ie: a local set may be formed of arrival/departure events in the same physical transit station. In another embodiment, a local set may comprise a connected component in which neighbouring pairs of events are separated by a walking distance less than 50 m. Thus, for example a connected component may include the events for stops A, B and C, where A and B are separated by less than 50 m and B and C are separated by less than 50 m, even if A and C are separated by more than 50 m. The connected component may be computed before assigning events to endpoints, or alternatively afterwards. In some embodiments, it may be convenient to calculate the connected component at the same time as calculating walking transfers between stop pairs to generate additional transfers as described above.

CONCLUSION

It will be appreciated for example that the process of forming a transit transfer network shown in FIG. 3 is exemplary and that many variations are possible. For example, although the process can operate first on target endpoints and then source endpoints, alternatively the process may operate first on source endpoints and then target endpoints (ie: steps. 340 and 350 may be swapped with steps 360 and 370).

According to various embodiments of the invention, a transit transfer network is formed in which all events belong to exactly one endpoint and in which the feasibility of transfers respects the raw data. That is to say, given an arrival event at time t1 and departure event at time t2, if the transfer time between their respective endpoints has a duration t, then t1+t<=t2 if and only if the transfer was possible according to the raw data.

According to various embodiments, events are grouped into endpoints in an efficient way such that events in a particular endpoint have shared properties with respect to transfers. One or more acceptable transfer durations are assigned for transfers between endpoints such that between any pair of first and second endpoints connected by a transfer, at least one transfer time is defined that applies to all of the transfers from the events of the first endpoint to the events of the second endpoint.

The conflation scheme reduces the number of transfer endpoints, so that the performance of applications generating transit directions is improved. Embodiments of the invention achieve impressive compression rates—in some instances, stations with thousands of arrival and departure events are clustered into only a dozen transfer endpoints.

Many modifications and variations of the embodiments described herein will be evident to those skilled in art. It will be appreciated that the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, the reference to these arrangements of operations in terms of modules should not be considered to imply a structural limitation and references to functional names is by way of illustration and does not infer a loss of generality.

Unless specifically stated otherwise as apparent from the description above, it is appreciated that throughout the description, discussions utilising terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be understood that the process steps, instructions, of the present invention as described and claimed, are executed by computer hardware operating under program control, and not mental steps performed by a human. Similarly, all of the types of data described and claimed are stored in a computer readable storage medium operated by a computer system, and are not simply disembodied abstract ideas.

The present invention also relates to an apparatus for performing the operations herein. This apparatus may be specially constructed for the required purposes, or it may comprise a general-purpose computer selectively activated or reconfigured by a computer program stored on a computer readable medium that can be executed by the computer. Such a computer program are stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein can be executed by any type or brand of computer or other apparatus. Various general-purpose systems may also be used with programs in accordance with the teachings herein, or it may prove convenient to construct more specialized apparatus to perform the described method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided by way of illustrative example.

The invention claimed is:

1. A computer-implemented method of constructing a transit transfer network from transit data, comprising:
   processing, by one or more computing device, transit data to define a plurality of transfer endpoints, including one or more source endpoints and one or more target endpoints;
   determining, by the one or more computing devices, a set of acceptable transfer durations from the one or more source endpoints to the one or more target endpoints for each of a plurality of transfers associated with the transfer endpoints;
   determining, by the one or more computing devices, one or more groups of source endpoints and target endpoints to be merged based at least in part on one or more sets of acceptable transfer durations, each group comprising two or more endpoints, wherein transfers associated with the endpoints in each said group have one or more common acceptable transfer durations; and
   merging, by the one or more computing devices, endpoints in each group to form one or more merged source endpoints and target endpoints based at least in part on one or more sets of acceptable transfer durations wherein the one or more merged endpoints are less than the plurality of transfer endpoints resulting in fewer transfer endpoints than the plurality of transfer endpoints to form the transit transfer network.

2. A computer-implemented method as claimed in claim 1, wherein determining one or more groups of endpoints to be merged comprises determining incompatible endpoints based on sets of acceptable transfer durations, and determining one or more groups of compatible endpoints to be merged.

3. A computer-implemented method as claimed in claim 2, wherein determining one or more groups of compatible endpoints to be merged comprises:
   forming an incompatibility graph of incompatible endpoints; and
   carrying out a graph coloring on the incompatibility graph, wherein each group of compatible endpoints relates to a different color in the graph coloring.

4. A computer-implemented method as claimed in claim 2, wherein first and second endpoints are determined to be incompatible if it is determined that:
   there is a third endpoint which is associated by transfers with both the first and second endpoints; and
   there is no acceptable transfer duration that would suit both the transfer associating the first and third endpoints and the transfer associating the second and third endpoints.

5. A computer-implemented method as claimed in claim 1, wherein merging the endpoints in each group comprises intersecting sets of acceptable transfer durations for transfers associated with endpoints of the group.

6. A computer-implemented method as claimed in claim 1, wherein defining said plurality of transfer endpoints comprises defining a first set of endpoints and a second set of endpoints, wherein one of the first and second sets of endpoints comprises a set of one or more source endpoints and wherein the other of said first and second sets of endpoints comprises one or more target endpoints, comprising
   determining one or more groups of endpoints of the first set to be merged, and merging the endpoints in each group to form at least one merged endpoint; and determining one or more groups of endpoints of the second set to be merged, and merging the endpoints in each group to form at least one merged endpoint.

7. A computer-implemented method as claimed in claim 1, wherein each set of acceptable transfer durations comprises an interval of acceptable transfer durations.

8. A computer-implemented method of constructing a transit transfer network from transit data, comprising:
- defining, by one or more computing device, a plurality of transfer endpoints, including one or more source endpoints and one or more target endpoints, based on the transit information;
- determining, by the one or more computing devices, incompatible endpoints based at least in part on one or more sets of acceptable transfer durations from the one or more source endpoints and one or more target endpoints for each of a plurality of transfers associated with the transfer endpoints;
- selecting, by the one or more computing devices, one or more sets of source endpoints and target endpoints to be merged based at least in part on one or more sets of acceptable transfer durations such that the endpoints of each set are not incompatible; and
- merging, by the one or more computing devices, the endpoints of each set to form at least one merged source endpoint and target endpoint based at least in part on one or more sets of acceptable transfer durations, wherein the merged endpoints are less than the plurality of transfer endpoints resulting in fewer transfer endpoints than the plurality of transfer endpoints to form the transit transfer network.

9. A computer-implemented method as claimed in claim 8, wherein selecting one or more sets of compatible endpoints comprises:
- forming an incompatibility graph of incompatible endpoints; and
- carrying out a graph coloring on the incompatibility graph to provide an assignment from endpoints to sets of compatible endpoints, wherein each set of compatible endpoints corresponds to a different color of the graph coloring.

10. A computer-implemented method as claimed in claim 8, wherein first and second endpoints are determined to be incompatible if it is determined that:
- there is a third endpoint which is associated by transfers with both the first and second endpoints; and
- there is no acceptable transfer duration that would suit both the transfer associating the first and third endpoints and the transfer associating the second and third endpoints.

11. An apparatus comprising at least one processor and at least one memory storing instructions when executed by the at least one processor cause the at least one processor to:
- process transit data to define a plurality of transfer endpoints, including one or more source endpoints and one or more target endpoints;
- determine a set of acceptable transfer durations from the one or more source endpoints and one or more target endpoints for each of a plurality of transfers associated with the transfer endpoints;
- determine one or more groups of source endpoints and target endpoints to be merged based at least in part on one or more sets of acceptable transfer durations, each group comprising two or more endpoints, wherein transfers associated with the endpoints in each said group have one or more common acceptable transfer durations; and
- merge the endpoints in each group to form one or more merged source endpoints and target endpoints based at least in part on one or more sets of acceptable transfer durations wherein the one or more merged endpoints are less than the plurality of transfer endpoints resulting in fewer transfer endpoints than the plurality of transfer endpoints to form the transit transfer network.

12. An apparatus as claimed in claim 11, wherein determining one or more groups of endpoints to be merged comprises determining incompatible endpoints based on sets of acceptable transfer durations, and determining one or more groups of compatible endpoints to be merged.

13. An apparatus as claimed in claim 12, wherein determining one or more groups of compatible endpoints to be merged comprises:
- forming an incompatibility graph of incompatible endpoints; and
- carrying out a graph coloring on the incompatibility graph, wherein each group of compatible endpoints relates to a different color in the graph coloring.

14. An apparatus as claimed in claim 11, wherein merging the endpoints in each group comprises intersecting sets of acceptable transfer durations for transfers associated with endpoints of the group.

15. An apparatus comprising at least one processor and at least one memory storing instructions when executed by the at least one processor cause the at least one processor to
- define a plurality of transfer endpoints, including one or more source endpoints and one or more target endpoints based on the transit information;
- determine incompatible endpoints based at least in part on one or more sets of acceptable transfer durations from the one or more source endpoints and one or more target endpoints for each of a plurality of transfers associated with the transfer endpoints;
- select one or more sets of source endpoints and target endpoints to be merged based at least in part on one or more sets of acceptable transfer durations such that the endpoints of each set are not incompatible; and
- merge the endpoints of each set to form at least one merged source endpoint and target endpoint based at least in part on one or more sets of acceptable transfer durations wherein the merged endpoints are less than the plurality of transfer endpoints resulting in fewer transfer endpoints than the plurality of transfer endpoints to form the transit transfer network.

16. An apparatus as claimed in claim 15, wherein the instructions when executed by the at least one processor further cause the at least one processor to:
- form an incompatibility graph of incompatible endpoints; and
- carry out a graph coloring on the incompatibility graph to provide an assignment from endpoints to sets of compatible endpoints, wherein each set of compatible endpoints corresponds to a different color of the graph coloring.

17. A transit directions system comprising a query resolution module to resolve user queries for transit directions, a transit interface to receive transit data from one or more transit data providers, and a transit transfer network module to form a transit transfer network using received transit data, wherein the transit transfer network module comprises:
- an endpoint definition module to define a plurality of transfer endpoints, including one or more source endpoints and one or more target endpoints based on transit data;
- an incompatibilities module to determine incompatible endpoints based at least in part on sets of acceptable transfer durations from the one or more source endpoints and one or more target endpoints for each of a plurality of transfers associated with the transfer endpoints;

a set selection module to select one or more sets of source endpoints and target endpoints to be merged based at least in part on one or more sets of acceptable transfer durations such that the endpoints of each set are not incompatible; and a conflation module to merge the endpoints of each set to form at least one merged sourced endpoint and target endpoint based at least in part on one or more sets of acceptable transfer durations wherein the merged endpoints are less than the plurality of transfer endpoints resulting in fewer transfer endpoints than the plurality of transfer endpoints to form the transit transfer network.

18. A transit directions system as claimed in claim 17, wherein the incompatibilities module is configured to form an incompatibility graph, and wherein the set selection module comprises a graph coloring module to carry out a graph coloring on the incompatibility graph.

19. A transit directions system as claimed in claim 17, wherein the transit transfer network module further comprises an interval calculation module to calculate intervals of acceptable transfer durations for transfers associated with transfer endpoints.

20. A transit directions system as claimed in claim 17, further comprising a transit graph module to form a transit graph, and a transfer arc module to determine transfer arcs between nodes of the transit graph using the transit transfer network.

* * * * *